US012205563B2

(12) United States Patent
Kurilchik

(10) Patent No.: US 12,205,563 B2
(45) Date of Patent: Jan. 21, 2025

(54) NECKS FOR USE IN STRING INSTRUMENTS

(71) Applicant: Phillip Kurilchik, Waterloo, IA (US)

(72) Inventor: Phillip Kurilchik, Waterloo, IA (US)

(73) Assignee: Phillip Kurilchik, Waterloo, IA (US)

( * ) Notice: Subject to any disclaimer, the term of this patent is extended or adjusted under 35 U.S.C. 154(b) by 452 days.

(21) Appl. No.: 17/727,667

(22) Filed: Apr. 22, 2022

(65) Prior Publication Data

US 2022/0343880 A1 Oct. 27, 2022

Related U.S. Application Data

(60) Provisional application No. 63/178,347, filed on Apr. 22, 2021.

(51) Int. Cl.
*G10D 3/06* (2020.01)
*G10D 1/08* (2006.01)

(52) U.S. Cl.
CPC ................ *G10D 3/06* (2013.01); *G10D 1/08* (2013.01)

(58) Field of Classification Search
CPC ........... G10D 3/06; G10D 1/08; G10D 13/00; G10D 1/00
See application file for complete search history.

(56) References Cited

U.S. PATENT DOCUMENTS 3,417,646 A * 12/1968 Hall ........................ G10D 3/06 84/293

* cited by examiner

*Primary Examiner* — Kimberly R Lockett
(74) *Attorney, Agent, or Firm* — Faegre Drinker Biddle & Reath LLP

(57) ABSTRACT

At least some embodiments of the present disclosure are directed to necks for use in a string instrument having a proximal end, a distal end that opposes the proximal end, and an elongated neck shaft extending from the proximal end to the distal end so as to define a frontside disposed proximate a fingerboard and a backside that is opposite the fingerboard. A thickness of the elongated neck shaft is defined between the fingerboard and a backmost portion of the backside. The elongated neck shaft may include distal end portion having a distal end portion thickness that is larger than a proximal end portion thickness of the proximal end portion of the elongated neck shaft.

20 Claims, 7 Drawing Sheets

NECKS FOR USE IN STRING INSTRUMENTS

CROSS-REFERENCE TO RELATED APPLICATION

This application claims priority to U.S. Provisional Patent Application No. 63/178,347, filed Apr. 22, 2021, which is herein incorporated by reference in its entirety.

TECHNICAL FIELD

The present disclosure pertains to string instruments. More particularly, the present disclosure pertains to necks for use in string instruments.

BACKGROUND

Some string instruments include a body and a neck, the neck projecting from the body and serving as the base of a fingerboard. Guitars, banjos, ukuleles, lutes, the violin family, and the mandolin family are examples of string instruments that have such necks. On an electric guitar, for example, the neck has one end that connects to or includes the headstock of the guitar at the guitar nut, and another end that may be connectable to the body of the guitar at the neck joint. Some necks have no headstock feature.

During play, a player's hand is wrapped around and moving along the neck. Further, fingers on the players hand are often applying pressure to the strings or moving relative to the strings (e.g., into position for various notes or chords to be played). As such, the form factor of the neck can influence ergonomics of the guitar.

SUMMARY

In Example 1, a neck for use in a string instrument includes a proximal end, a distal end that opposes the proximal end, and an elongated neck shaft extending from the proximal end to the distal end so as to define a frontside disposed proximate a fingerboard and a backside that is opposite the fingerboard, the proximal end is connectable to a body of the string instrument, the distal end is connectable to or includes a headstock. The elongated neck shaft includes a proximal end portion that extends distally from the proximal end toward the distal end, a distal end portion that extends proximally from the distal end toward the proximal end, and a middle portion that is flanked by the proximal end portion and the distal end portion. A thickness of the elongated neck shaft is defined between the fingerboard and a backmost portion of the backside, and the distal end portion has a distal end portion thickness that is larger than a proximal end portion thickness of the proximal end portion.

In Example 2, the neck of Example 1, wherein the proximal end portion, the middle portion, and the distal end portion form a tapered portion having a continuous gradual taper along a length of the elongated neck shaft.

In Example 3, the neck of Example 1, wherein the proximal end portion tapers at a first slope, the middle portion tapers at a second slope, and the distal end portion tapers at a third slope; wherein the first slope, the second slope, and the third slope are identical.

In Example 4, the neck of Example 1, wherein the proximal end portion tapers at a first slope, the middle portion tapers at a second slope, and the distal end portion tapers at a third slope; wherein at least two of the first, second, and third slopes are different from each other.

In Example 5, the neck of Example 4, wherein the first slope is different from the second slope.

In Example 6, the neck of Example 4, wherein the second slope is different from the third slope.

In Example 7, the neck of Example 1, wherein the proximal end portion, the middle portion and the distal end portion form a tapered portion having a stepped taper along a length of the elongated neck shaft.

In Example 8, the neck of Example 1, wherein a shape profile is defined as a shape of a cross section of the backside of the elongated neck shaft; wherein the backside has a variable shape profile along a portion of the elongated neck shaft.

In Example 9, the neck of Example 8, wherein the proximal end portion has a first shape profile and the distal end portion has a second shape profile.

In Example 10, the neck of Example 9, wherein the first and the second shape profile are identical.

In Example 11, the neck of Example 10, wherein the first shape profile is U-shaped and the second shape profile is ovally C-shaped.

In Example 12, the neck of Example 1, further comprising frets that are spaced apart along the fingerboard, wherein the thickness of the distal end portion is defined at about a first fret adjacent the distal end; wherein the thickness of the proximal end portion is defined at about a twelfth fret adjacent the proximal end.

In Example 13, the neck of Example 12, wherein a thickness of the distal end portion is about 0.80 to about 1.12 inches, and a thickness of the proximal end portion is about 0.75 to about 1.00 inches.

In Example 14, the neck of Example 12, wherein a thickness of the distal end portion is about 0.865 inches, and a thickness of the proximal end portion is about 0.780 inches.

In Example 15, the neck of Example 1, wherein the neck further comprises a heel portion protruding from the proximal end, the heel portion being configured to be fastened to the body of the string instrument.

In Example 16, the neck of Example 1, wherein the neck is designed to be modularly connectable to a guitar body.

In Example 17, a string instrument has a neck, and the neck includes a proximal end, a distal end that opposes the proximal end, and an elongated neck shaft extending from the proximal end to the distal end so as to define a frontside disposed proximate a fingerboard and a backside that is opposite the fingerboard, the proximal end is connectable to a body of the string instrument, the distal end is connectable to or includes a headstock. The elongated neck shaft includes a proximal end portion that extends distally from the proximal end toward the distal end, a distal end portion that extends proximally from the distal end toward the proximal end, and a middle portion that is flanked by the proximal end portion and the distal end portion. A thickness of the elongated neck shaft is defined between the fingerboard and a backmost portion of the backside, and the distal end portion has a distal end portion thickness that is larger than a proximal end portion thickness of the proximal end portion.

In Example 18, a method of making a neck for use in a string instrument includes forming a neck blank having a proximal end and a distal end that opposes the proximal end into an elongated neck shaft extending from the proximal end to the distal end and having a frontside and a backside opposite the frontside. The elongated neck shaft includes a proximal end portion that extends distally from the proximal end toward the distal end, a distal end portion that extends proximally from the distal end toward the proximal end, and a middle portion that is flanked by the proximal end portion and the distal end portion. A thickness of the elongated neck shaft is defined between the fingerboard and a backmost portion of the backside, and the distal end portion has a distal end portion thickness that is larger than a proximal end portion thickness of the proximal end portion.

In Example 19, the method of Example 18, wherein the proximal end portion, the middle portion, and the distal end portion form a tapered portion having a continuous gradual taper along a length of the elongated neck shaft.

In Example 20, the method of Example 18, wherein the proximal end portion tapers at a first slope, the middle portion tapers at a second slope, and the distal end portion tapers at a third slope; wherein at least two of the first, second, and third slopes are different from each other.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
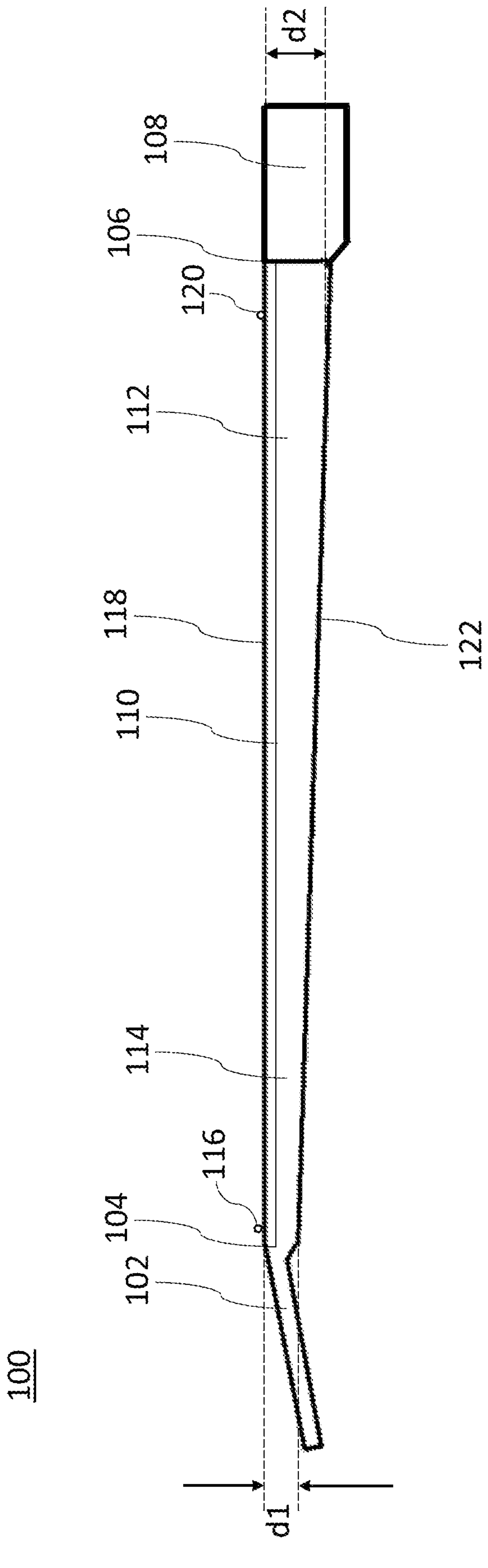
FIG. 1 is a schematic side view illustration of a string instrument neck, according to prior art.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

As mentioned above, a neck is an important part of a string instrument. It connects the headstock and the body, and strings may vibrate along the length of the neck during playing. Necks of different shapes and thicknesses may affect the way sound energy travels through the instrument, thus affecting the tonal quality of the instrument. In addition, players with different hand size and/or music genre preference may prefer necks with different sizes or designs. There is a continuing need for improved necks for use in string instruments for better playability, tone quality, and variability depending on players' preference and hand size.

At least some embodiments of the present disclosure are directed to a neck for use in a string instrument including a distal end, a proximal end sized and configured such that the proximal end can attach to a body of the string instrument, and an elongated neck shaft connecting the proximal end to the distal end and having a proximal end portion and a distal end portion. In some embodiments, the distal end portion has a thickness larger than the proximal end portion, such that the neck has a continuous gradual taper in a direction from the distal end to the proximal end along a length of the neck. The neck as disclosed in the present disclosure may be used in any string instrument, such as guitars, banjos, ukuleles, lutes, the violin family, and the mandolin family. In some embodiments, the neck may be used in various guitars such as electric guitars, solid-body electric guitars, acoustic guitars, semi-hollow guitars, base guitars or guitars with various number of strings (e.g., more than 6 strings, 6 strings, or fewer than 6 strings). In some embodiments, the neck may be a bolt-on neck for use in electric guitars. In some embodiments, the neck may be a glued in set neck for use in electric guitars.

FIG. 1 is a schematic side view illustration of a string instrument neck, according to prior art.

As shown in FIG. 1, neck 100 includes a headstock 102, a distal end 104 connected to the headstock 102, and a proximal end 106. In some embodiments, the proximal end may optionally include a heel portion 108 protruding out of the proximal end 106. The proximal end 106 may be sized and configured to attach to a body of the string instrument (not shown). The neck includes an elongated neck shaft 110 connecting the proximal end 106 to the distal end 104 and has a proximal end portion 112 and a distal end portion 114.

As shown, distal end portion 114 of the elongated neck shaft 110 has a thickness (or depth) d1. In some embodiments, where the neck is for use in a guitar, the depth may be measured at a first fret 116 on the fingerboard 118 adjacent the distal end 104. The proximal end portion 112 of the elongated neck shaft 110 has a thickness d2. In some embodiments, where the neck is for use in a guitar, the depth or thickness d2 may be measured at a twelfth fret 120 on the fingerboard 118 adjacent the proximal end 106.

Traditionally, necks for string instrument (e.g., electric guitar, acoustic guitar, etc.) are designed with a thinner end closer to the headstock 102, a thicker end closer to the body of the instrument, and a continuous gradual taper from the thicker end to the thinner end (hereinafter "a positive taper"). As the thickness increases from the thinner end towards the thicker end, the playing hand and web of hand experiences more contact with the backside 122 of the neck shaft. The increased thickness can create discomfort in the playing hand (e.g., the fretting hand when playing a guitar) as well as decrease agility in the fretting fingers.

Some players have certain play styles that require playing more in the higher fret register (e.g., closer to the body) of an instrument more frequently. For example, a guitar soloist may play more within the middle and higher frets than the lower frets, thus spending more time towards the proximal end 106 of the elongated neck shaft 110. Too large of a thickness d2 may create discomfort and fatigue in the hand for such play style. However, with the current design as illustrated in FIG. 1, making the elongated neck shaft 110 dimensionally thinner may weaken the neck 100 at the distal end 104 and making it prone to breakage especially where the elongated neck shaft 110 transitions into the headstock 102. In addition, d1 being too thin may also cause discomfort and difficulty to the playing hand.

Figure 2:
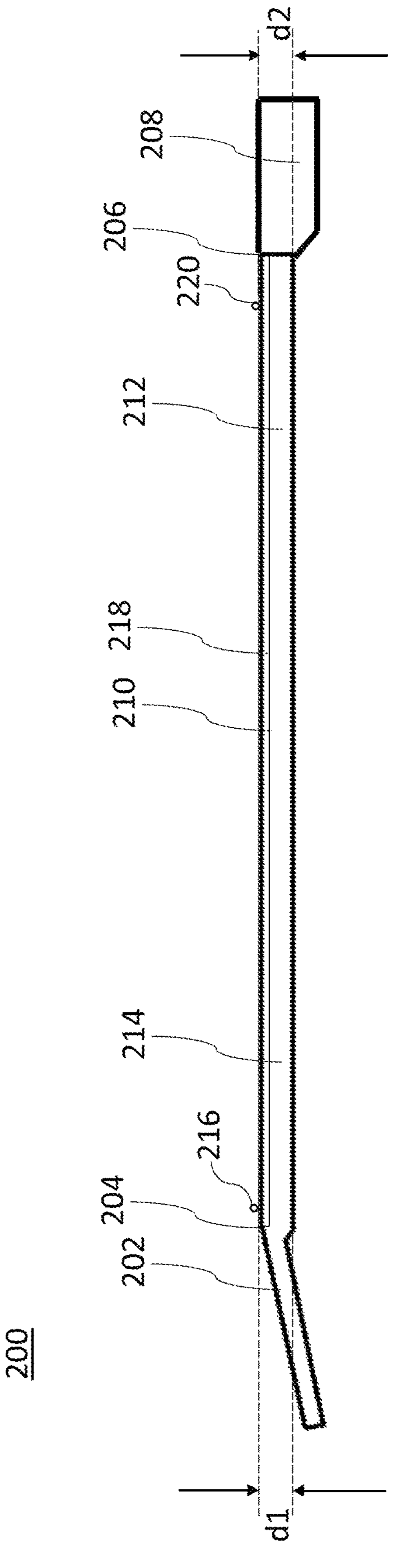
FIG. 2 is a schematic side view illustration of a string instrument neck, according to prior art.

FIG. 2 is a schematic side view illustration of a string instrument neck, according to prior art.

As shown in FIG. 2, neck 200 includes a headstock 202, a distal end 204 connected to the headstock 202, and a proximal end 206. In some embodiments, the proximal end may optionally include a heel portion 208 protruding out of the proximal end 206. The proximal end 206 may be sized and configured to attach to a body of the string instrument (not shown). The neck includes an elongated neck shaft 210 connecting the proximal end 206 to the distal end 204 and has a proximal end portion 212 and a distal end portion 214.

As shown, distal end portion 214 of the elongated neck shaft 210 has a thickness (or depth) d1. In some embodiments, where the neck is for use in a guitar, the depth may be measured at a first fret 216 on the fingerboard 218 adjacent the distal end 204. The proximal end portion 212 of the elongated neck shaft 210 has a thickness d2. In some embodiments, where the neck is for use in a guitar, the depth may be measured at a twelfth fret 220 on the fingerboard 218 adjacent the proximal end 206.

With the design illustrated in FIG. 2, distal end portion 214 and proximal end portion 212 have the same thickness along the length of the elongated neck shaft 210. However, such design may run into the same issues as discussed above regarding the "positive taper" neck.

Figure 3A:
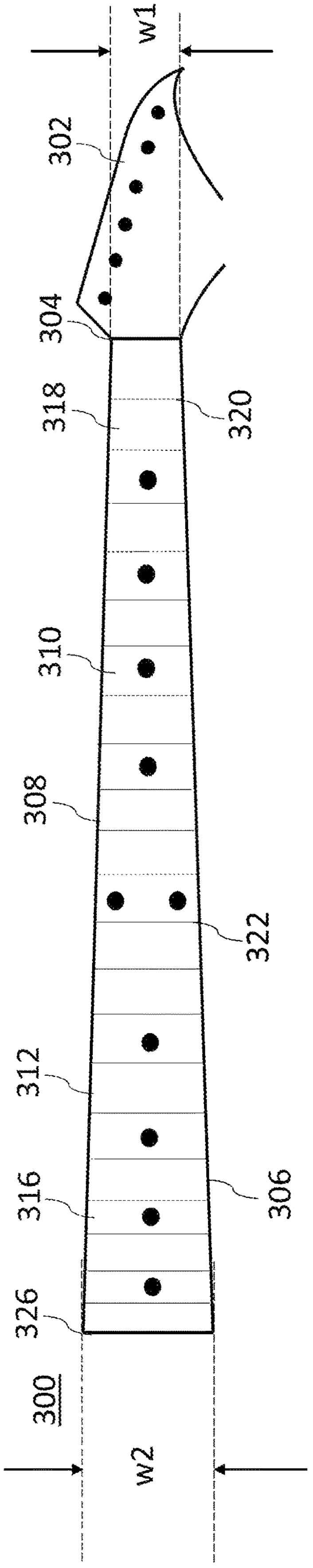
FIG. 3A is a schematic front view illustration of a string instrument neck, according to an embodiment of the present disclosure.
Figure 3B:
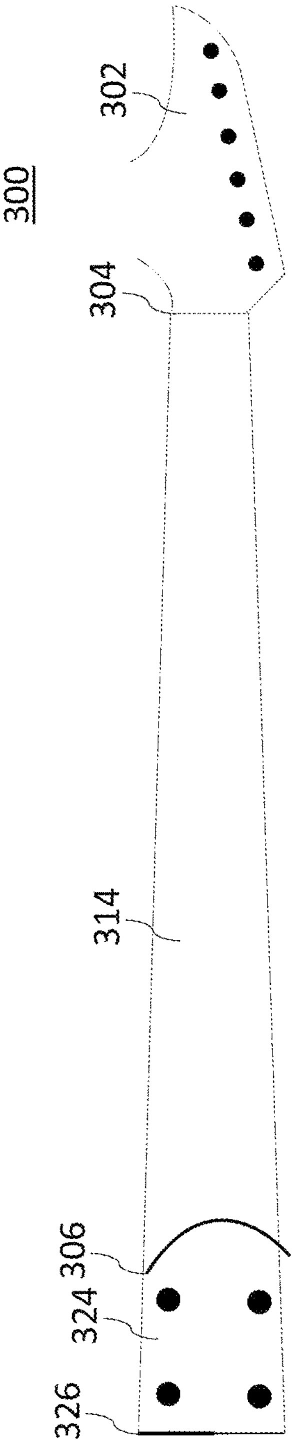
FIG. 3B is a schematic back view illustration of a string instrument neck, according to an embodiment of the present disclosure.

FIGS. 3A and 3B are schematic front and back view illustrations, respectively, of a string instrument neck, according to an embodiment of the present disclosure.

As shown, neck 300 includes a distal end 304 and a proximal end 306 that opposes the distal end 304. The proximal end 306 may be sized and configured to be connectable to a body of the string instrument (not shown). In some embodiments, the distal end 304 is connectable to or includes a headstock 302.

In embodiments, neck 300 has an elongated neck shaft 308 extending from the proximal end 306 to the distal end 304 so as to define a frontside 310 disposed proximate a fingerboard 312 and a backside 314 that is opposite the fingerboard 312. The elongated neck shaft 308 extending from the proximal end 306 to the distal end 304 also defines a proximal end portion 316 and a distal end portion 318.

As shown, distal end portion 318 of the elongated neck shaft 308 has a width w1. In some embodiments, where the neck is for use in a guitar, the width may be measured at a first fret 320 on the fingerboard 312 adjacent the distal end 304. The proximal end portion 316 of the elongated neck shaft 308 has a width w2. In some embodiments, the proximal end portion 316 may be optionally connected to a heel portion 324. As shown, the width w2 may be measured at a proximal most end 326 of the neck 300. In an embodiment where the proximal end portion 316 is not connected to a heel portion, the width w2 may be measured at the proximal end 306, which is the proximal most end without the optional heel portion.

As shown, w2 is larger than w1 as the width of the elongated neck shaft gradually increases along the length of the distal end portion 318 and the proximal end portion 316. In some embodiments, where the neck 300 is for use in a six-string guitar, w1 may be about 1.63 to about 2.0 inches wide, and w2 may be about 2.19 to about 2.25 inches wide. In some embodiments, w1 may be about 1.687 inches, and w2 may be about 2.25 inches. It is to be understood that the width listed here is exemplary only for use in a six-string guitar, and any width that is not listed may be used in an instrument that is not a guitar, or a guitar having more or fewer than six strings. When combined with a traditional neck design as described in FIGS. 1-2, the increase in both the width and the depth of the neck 300 would further increase the discomfort of players' fingers as they move along the fingerboard 312 from a lower fret (e.g., the first fret 320) to a higher fret (e.g., the twelfth fret 322).

Figure 4A:
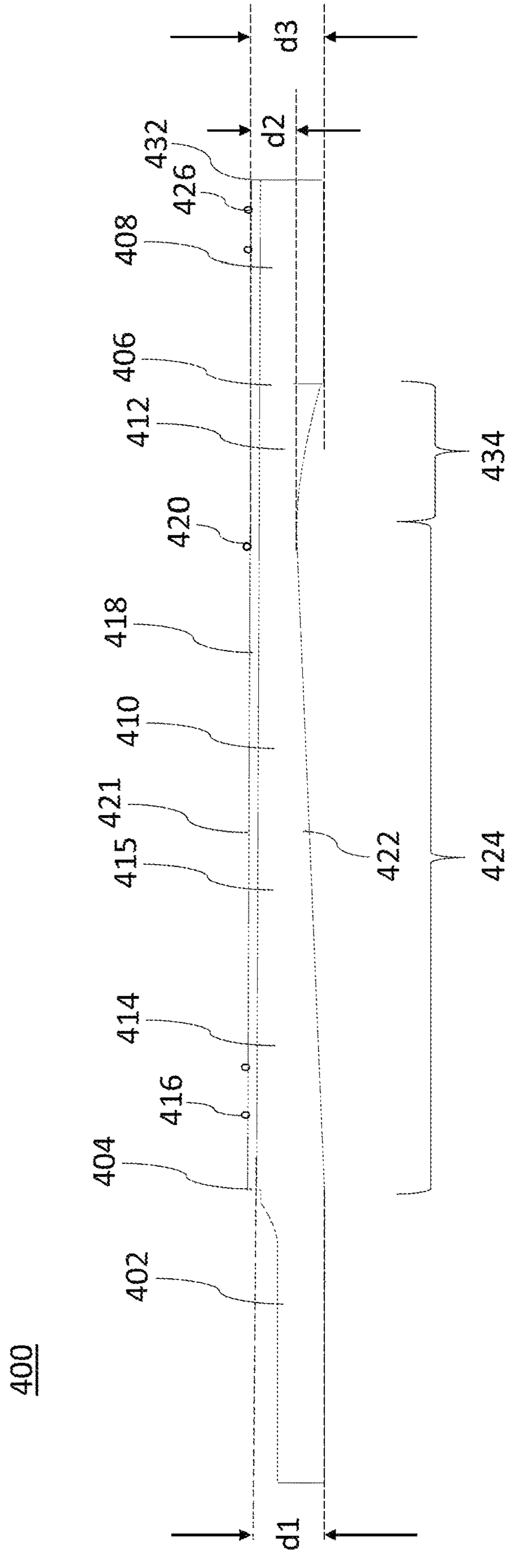
FIG. 4A is a schematic side view illustration of a string instrument neck, according to an embodiment of the present disclosure.

FIG. 4A is a schematic side view illustration of a string instrument neck, according to an embodiment of the present disclosure. The neck 400 may be designed to be modularly connectable to a guitar body.

As shown in FIG. 4A, neck 400 includes a headstock 402, a distal end 404 connected to the headstock 402, and a proximal end 406 that opposes the distal end 404. In some embodiments, the proximal end may optionally include a heel portion 408 protruding out of the proximal end 406. The heel portion 408 may be configured to be fastened to the body of a string instrument. The proximal end 406 may be sized and configured to be connectable to a body of the string instrument (not shown), and the distal end 404 may be connectable to or includes the headstock 402. The neck 400 includes an elongated neck shaft 410 connecting the proximal end 406 to the distal end 404 and has a proximal end portion 412 that extends distally from the proximal end 406 toward the distal end 404 and a distal end portion 414 that extends proximally from the distal end 404 toward the proximal end 406. In some embodiments, the elongated neck shaft 410 further includes a middle portion 415 that is flanked by the proximal end portion 412 and the distal end portion 414.

The elongated neck shaft 410 extending from the proximal end 406 to the distal end 404 defines a frontside 421 disposed proximate the fingerboard 418 and a backside 422 that is opposite the fingerboard 418. As shown, distal end portion 414 of the elongated neck shaft 410 has a thickness (or depth) d1. The thickness of the elongated neck shaft 410 is defined between the fingerboard 418 and a backmost portion of the backside 422. In some embodiments, where the neck is for use in a guitar, the depth may be measured at around a first fret 416 on the fingerboard 418 adjacent the distal end 404. The proximal end portion 412 of the elongated neck shaft 410 has a thickness d2. In some embodiments, where the neck is for use in a guitar, the depth may be measured at around a twelfth fret 420 on the fingerboard 418 adjacent the proximal end 406. In some embodiments, the depth d2 may be measured at a seventh, or eighth, or nineth, or tenth, or eleventh, or thirteenth, or fourteenth, or fifteenth fret. In some embodiments, where the string instrument does not have frets, the depth d2 may be measured at any point adjacent the distal end 404, or any point within the distal end portion 414. In some embodiments, the depth d2 may be measured at a point on the middle portion 415.

In some embodiments, the distal end portion 414 has a distal end portion thickness (d1) that is larger than a proximal end portion thickness (d2) of the proximal end portion 412. In some embodiments, where the neck 400 is for use in a six-string guitar, d1 may be about 0.80 to about 1.12 inches thick, and d2 may be about 0.75 to about 1.0 inches thick. In some instances, for example where the neck 400 is for use in a six-string guitar, d1 may be about 0.90 inches, and d2 may be about 0.83 inches. In some instances, for example where the neck 400 is for use in a six-string guitar, d1 may be about 0.865 inches, and d2 may be about 0.78 inches. In some embodiments, the neck 400 may be a bolt-on neck for use in an electric guitar. In some embodiments, for example as shown in FIG. 4A, the elongated neck shaft 410 has a tapered portion 424 having a continuous gradual taper along the length of the proximal end portion 412, the middle portion 415, and the distal end portion 414. As shown, the tapered portion 424 may not span all of the proximal end portion 412, the thickness of the elongated neck shaft 410 may increase from the twelfth fret 420 towards the proximal end 406 for parts of the proximal end portion 412 closer to the higher fret 426 on the fingerboard 418.

Necks with distal end portion 414 having thickness larger than proximal end portion 412, as defined in the present application, may be referred to as having a "reverse taper," as opposed to designs adopted in traditional guitar necks. Reverse taper necks have many benefits including improved middle and upper fret access due to its less bulky shape. The web of an instrument player's playing hand between their thumb and index finger has less contact with the backside 422 of the elongated neck shaft 410 (e.g., in the lower, middle, and/or higher fret range). Therefore, the playing hand may change shape easier with increased agility and has less fatigue while playing chords or single note runs. Any change in the playing hand position or orientation may contort the playing hand whenever neck shaft thickness increases in fingerboard width towards the body. The reduction of fatigue applies across various situations and making the change of hand shape easier whether the player is chording or soloing. In addition, having an increased section modulus between the first fret 416 and the headstock 402 transition improves the structural integrity of the elongated neck shaft 410, and thus the instrument as a whole. Moreover, for guitar players with a smaller hand or shorter fingers who usually has trouble accessing the twelfth fret 420 and higher frets (e.g., the highest fret 426), the "reverse taper" designs makes the higher frets more accessible due to the less bulky shape of the proximal end portion 412 compared to a traditional "positive taper" design. Even if a guitar player has larger hand and usually has no trouble accessing the higher frets, this improved "reverse taper" design may still offer players an alternative play style should they prefer necks with a slimmer design closer to the higher frets.

The reverse taper design may also provide acoustic benefits for the instrument. As the string vibrates along the length of the elongated neck shaft 410, the sound waves carrying vibration energy travel from the distal end portion 414 towards the proximal end portion 412. As the vibration energy travels from the distal end portion 414 adjacent the headstock 402 towards the proximal end portion 412 adjacent the body of the instrument (not shown), the resonant peak of the sound wave interfaces with the resonance of the material making up the body of the instrument. Having a reverse taper design helps channel the vibration energy from the elongated neck shaft 410 towards the optional heel portion 408 and into the body of the instrument. Without wishing to be bound by theory, the reason reverse taper design improves the sound quality of the instrument is because the vibration energy of sound waves meets less resistance when traveling along the neck in a direction from the headstock towards the instrument body. As the depth of the neck d1 decreases towards d2, the elongated neck shaft 410 helps channel the vibration energy by having less resistance through the thinning of the depth. On the other hand, for a traditional positive taper design, the sound wave carrying vibration energy would meet more resistance as it travels along the elongated neck shaft due to the increase in both width and depth of the neck.

In some embodiments, where the reverse taper neck 400 includes a heel portion 408, the heel portion 408 may have a heel thickness d3 measured at a proximal most end 432 of the heel portion 408. In some embodiments, as shown in FIG. 4A, the heel thickness d3 may be larger than d2. As the reverse taper design ends wherever d2 is measured (e.g., at the twelfth fret 420 in the shown example or any other fret as one skilled in the art will appreciate), the thickness stops decreasing at the d2 measurement point, and increases slightly to blend into the heel thickness d3. As shown in FIG. 4A, the blending portion 434 is located in between the twelfth fret 420 and the proximal end 406.

In some embodiments, as shown in FIG. 4A, the reverse taper on the back side of 422 of the neck 400 has one smooth slope from where d1 is measured to where d2 is measured. In some embodiments, the slope may vary along the length of the backside 422, as will be discussed in more details below regarding FIGS. 5 and 6.

Figure 4C:
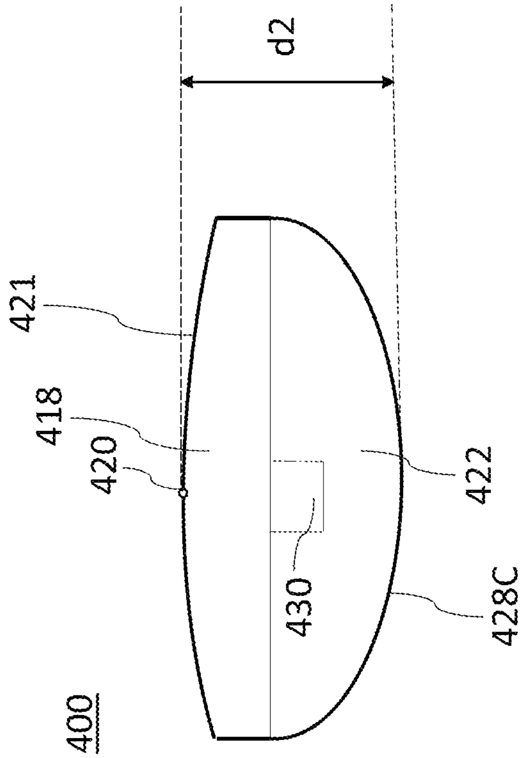
FIG. 4C is a cross-sectional view illustration of a string instrument neck, according to an embodiment of the present disclosure.
Figure 4B:
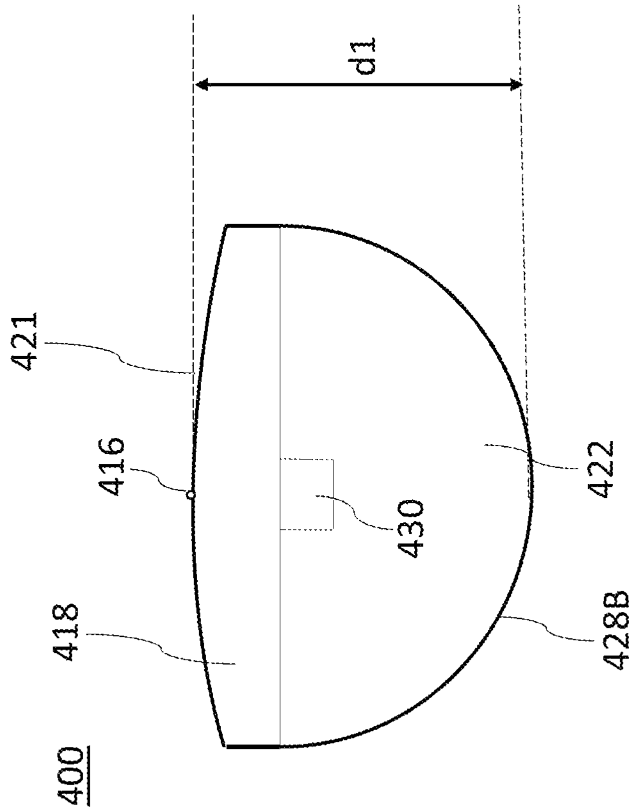
FIG. 4B is a cross-sectional view illustration of a string instrument neck, according to an embodiment of the present disclosure.

FIGS. 4B and 4C is a cross-sectional view illustration of a string instrument neck, according to an embodiment of the present disclosure; FIG. 4B shows the cross-sectional view at a distal end portion (e.g., the distal end portion 414 in FIG. 4A); FIG. 4C shows the cross-sectional view at a proximal end portion (e.g., the proximal end portion 412 in FIG. 4A).

The neck 400 may include a frontside 421 disposed proximate the fingerboard 418 and a backside 422 that is opposite the fingerboard 418. The fingerboard 418 and the portion of the neck 400 including the backside 422 may be glued together, and are flush with each other. In some embodiments, the neck 400 may optionally include an opening 430 for including a truss rod in a guitar. As shown in FIG. 4B, distal end portion the neck 400 has a thickness (or depth) d1. The thickness of the neck 400 is defined between the fingerboard 418 and a backmost portion of the backside 422. In some embodiments, where the neck is for use in a guitar, the depth may be measured at a first fret 416 on the fingerboard 418 adjacent the distal end (e.g., the distal end 404 in FIG. 4A). As shown in FIG. 4C, the proximal end portion of the neck 400 has a thickness d2. In some embodiments, a distal end portion (e.g., distal end portion 414) has a distal end portion thickness (d1) that is larger than a proximal end portion thickness (d2) of a proximal end portion (e.g., the proximal end portion 412 in FIG. 4A).

In some embodiments, the backside 422 has a back shape profile 428 between the first fret 416 and the twelfth fret 420. The back shape profile 428 is defined as the shape of the backside 422 in cross section. In some embodiments, the backside 422 may have a variable shape profile along a portion of the elongated neck shaft 410. The proximal end portion 412 may have a first shape profile and the distal end portion 414 may have a second shape profile that may be different. In some embodiments, the proximal end portion 412 and the distal end portion 414 may have the same shape profile on the backside 422. In some embodiments, the proximal end portion 412 and the distal end portion 414 may both have an ellipse back shape profile. In some embodiments, the proximal end portion 412 and the distal end portion 414 may both have a "C" back shape profile.

Whether the proximal end portion 412 and the distal end portion 414 has the same or different shape profile, it is desired for the back profile to have a constant flow for better playability.

In some embodiments, the proximal end portion 412 has a backside shape profile 428B of a "U" or ellipse shape as shown in FIG. 4B, and the distal end portion 414 has a backside shape profile 428C of an oval "C" shape as shown in FIG. 4C. As the thickness of the neck 400 tapers along the length of a tapered portion, the back shape profile 428 of the backside 422 may also gradually change along the length. As will be appreciated by a skilled artisan, any standard neck shape may be used along the length of the distal end portion and/or the proximal end portion. Common backside shape profiles include "C", "U", "V", "D", flat oval, hard/medium/soft "V", small/medium/large "C," asymmetrical, elliptical, etc., and each of the shape profiles may be made into thin, medium chunky, or fat as desired by the player's preference.

In some embodiments, a proximal end portion (e.g., the proximal end portion 412 in FIG. 4A) has the same back shape profile 428 as a distal end portion (e.g., the distal end portion 414 in FIG. 4A). In some embodiments, for example as shown in FIGS. 4B and 4C, the proximal end portion has a different back shape profile 428 as the distal end portion.

In some embodiments, the neck 400 may be a hybrid having both an increase in width from the distal end 404 to the proximal end 406 and a decrease in thickness in the same direction. The traditional design of width is manifested in the fingerboard 418, whereas the reverse taper design as discussed in the present disclosure is manifested through the change of thickness and/or shape on the back side 422 of the neck 400. Therefore, although the neck as shown has a novel reverse taper design as shown in FIG. 4A, the widest part of the neck (e.g., the proximal most end 326 as shown in FIGS. 3A and 3B) may still conform and fit into an industry standard neck pocket size. Having the dual design hybrid not only enables the neck to still fit into a neck pocket of a guitar body, but also enhances playability of the instrument and agility of the playing hand.

Figure 5:
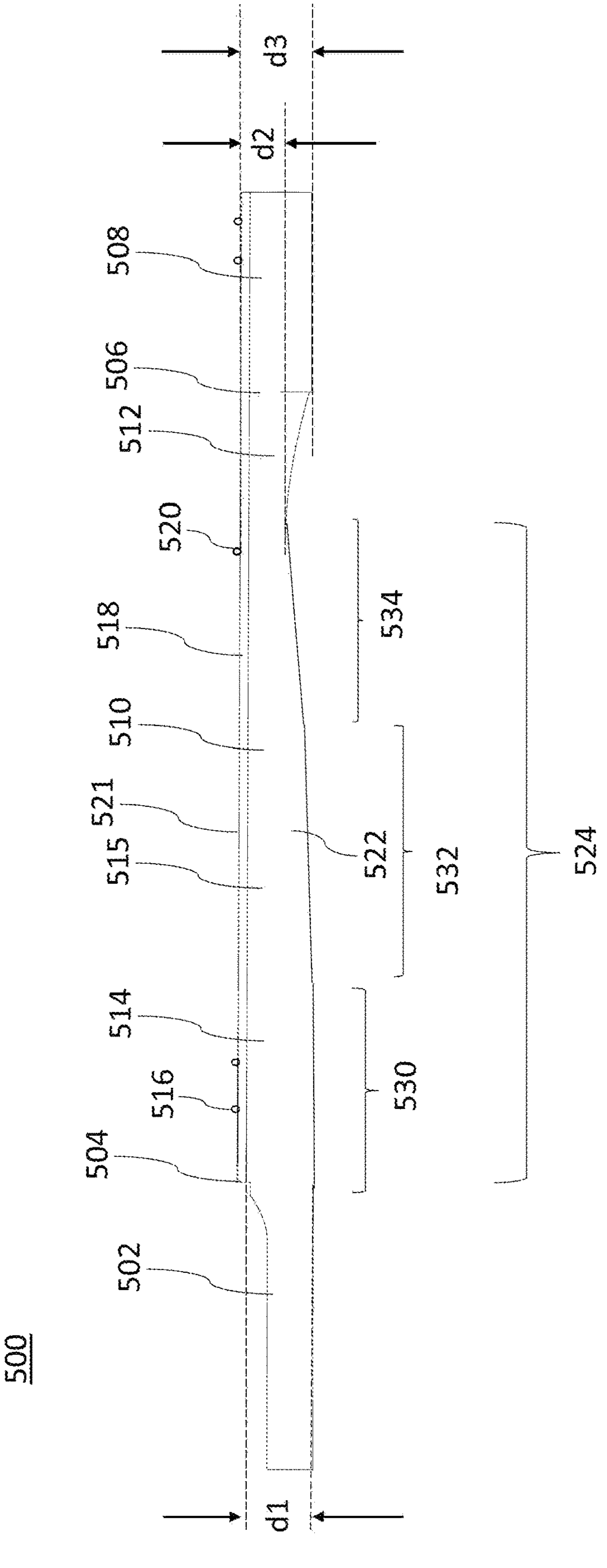
FIG. 5 is a schematic side view illustration of a string instrument neck, according to an embodiment of the present disclosure.

FIG. 5 is a schematic side view illustration of a string instrument neck, according to an embodiment of the present disclosure. The neck 500 may be designed to be modularly connectable to a guitar body.

As shown in FIG. 5, neck 500 includes a headstock 502, a distal end 504 connected to the headstock 502, and a proximal end 506 that opposes the distal end 504. In some embodiments, the proximal end may optionally include a heel portion 508 protruding out of the proximal end 506. The heel portion 508 may be configured to be fastened to the body of a string instrument. The proximal end 506 may be sized and configured to be connectable to a body of the string instrument (not shown), and the distal end 504 may be connectable to or includes the headstock 502. The neck 500 includes an elongated neck shaft 510 connecting the proximal end 506 to the distal end 504 and has a proximal end portion 512 that extends distally from the proximal end 506 toward the distal end 504 and a distal end portion 514 that extends proximally from the distal end 504 toward the proximal end 506. In some embodiments, the elongated neck shaft 510 further includes a middle portion 515 that is flanked by the proximal end portion 512 and the distal end portion 514.

The elongated neck shaft 510 extending from the proximal end 506 to the distal end 504 defines a frontside 521 disposed proximate the fingerboard 518 and a backside 522 that is opposite the fingerboard 518. As shown, distal end portion 514 of the elongated neck shaft 510 has a thickness (or depth) d1. The thickness of the elongated neck shaft 510 is defined between the fingerboard 518 and a backmost portion of the backside 522. In some embodiments, where the neck is for use in a guitar, the depth may be measured at about a first fret 516 on the fingerboard 518 adjacent the distal end 504. The proximal end portion 512 of the elongated neck shaft 510 has a thickness d2. In some embodiments, where the neck is for use in a guitar, the depth d2 may be measured at about a twelfth fret 520 on the fingerboard 518 adjacent the proximal end 506.

In some embodiments, the distal end portion 514 has a distal end portion thickness (d1) that is larger than a proximal end portion thickness (d2) of the proximal end portion 512. In some embodiments, where the neck 500 is for use in a six-string guitar, d1 may be about 0.80 to about 1.12 inches thick, and d2 may be about 0.75 to about 1.0 inches thick. In some embodiments, the proximal end portion tapers at a first slope 534, the middle portion tapers at a second slope 532, and the distal end portion tapers at a third slope 530. In some instances, for example as shown above in FIG. 4A, the first slope, the second slope, and the third slope are the same. In some instances, for example as shown in FIG. 5, the first slope 530 is different from the second slope 532, and the second slope 532 is different from the third slope 534. In some instances, the first slope 530 may be the same as the second slope 532, which is different from the third slope 534. In some embodiments, the elongated neck shaft 510 may include a tapered portion 524 having a stepped taper along the length of the proximal end portion 512, the middle portion 515 and the distal end portion 514. For the stepped taper design in FIG. 5, the first slope 530 is smaller than the second slope 532, and the second slope 532 is smaller than the third slope 534.

Figure 6:
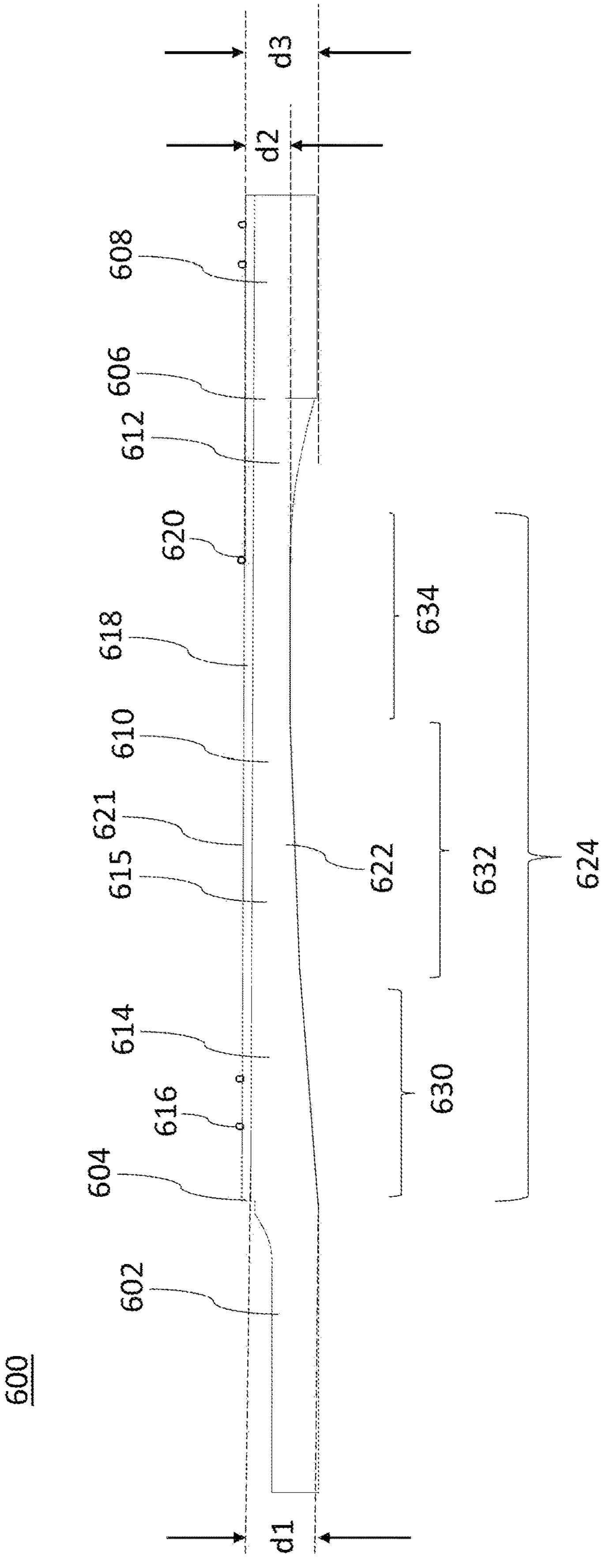
FIG. 6 is a schematic side view illustration of a string instrument neck, according to an embodiment of the present disclosure.

FIG. 6 is a schematic side view illustration of a string instrument neck, according to an embodiment of the present disclosure. The neck 600 may be designed to be modularly connectable to a guitar body.

As shown in FIG. 6, neck 600 includes a headstock 602, a distal end 604 connected to the headstock 602, and a proximal end 606 that opposes the distal end 604. In some embodiments, the proximal end may optionally include a heel portion 608 protruding out of the proximal end 606. The heel portion 608 may be configured to be fastened to the body of a string instrument. The proximal end 606 may be sized and configured to be connectable to a body of the string instrument (not shown), and the distal end 604 may be connectable to or includes the headstock 602. The neck 600 includes an elongated neck shaft 610 connecting the proximal end 606 to the distal end 604 and has a proximal end portion 612 that extends distally from the proximal end 606 toward the distal end 604 and a distal end portion 614 that extends proximally from the distal end 604 toward the proximal end 606. In some embodiments, the elongated neck shaft 610 further includes a middle portion 615 that is flanked by the proximal end portion 612 and the distal end portion 614.

The elongated neck shaft 610 extending from the proximal end 606 to the distal end 604 defines a frontside 621 disposed proximate the fingerboard 618 and a backside 622 that is opposite the fingerboard 618. As shown, distal end portion 614 of the elongated neck shaft 610 has a thickness (or depth) d1. The thickness of the elongated neck shaft 610 is defined between the fingerboard 618 and a backmost portion of the backside 622. In some embodiments, where the neck is for use in a guitar, the depth may be measured at a first fret 616 on the fingerboard 618 adjacent the distal end 604. The proximal end portion 612 of the elongated neck shaft 610 has a thickness d2. In some embodiments, where the neck is for use in a guitar, the depth may be measured at a twelfth fret 620 on the fingerboard 618 adjacent the proximal end 606.

In some embodiments, the distal end portion 614 has a distal end portion thickness (d1) that is larger than a proximal end portion thickness (d2) of the proximal end portion 612. In some embodiments, where the neck 600 is for use in a six-string guitar, d1 may be about 0.80 to about 1.12 inches thick, and d2 may be about 0.75 to about 1.0 inches thick. In some embodiments, the proximal end portion tapers at a first slope 634, the middle portion tapers at a second slope 632, and the distal end portion tapers at a third slope 630. In some instances, for example as shown above in FIG. 4A, the first slope, the second slope, and the third slope are the same. In some instances, for example as shown in FIG. 6, the first slope 630 is different from the second slope 632, and the second slope 632 is different from the third slope 634. In some instances, the first slope 630 may be the same as the second slope 632, which is different from the third slope 634. In some instances, the second slope 632 may be the same as the third slope 634, which is different from the first slope 630. In some embodiments, the elongated neck shaft 610 may include a tapered portion 624 having a stepped taper along the length of the proximal end portion 612, the middle portion 615 and the distal end portion 614. For the stepped taper design in FIG. 6, the first slope 630 is larger than the second slope 632, and the second slope 632 is smaller than the third slope 634.

The reverse taper neck may be made through a variety of ways. First a rectangular shape blank or rough stock is selected for making a neck shaft. The neck blank may include additional material in total length, width and thickness that exceeds the final size of the neck shaft. Similarly, a blank for making a fingerboard is also selected.

The neck blank is then secured or clamped (e.g., to a table or fixture) to eliminate any unnecessary rocking or movement while removing excess material to ensure accuracy. In some embodiments, the neck blank may be made of wood. In some embodiments, the neck blank may be made of metal. As is understood by a person of skill in the art, any material suitable for making a neck used in a string instrument may be selected as a material of the neck blank.

After the neck blank is secured, an elongated neck shaft profile, a distal end headstock shape and an optional heel portion is cut into the neck blank. The removal of excess material requires the blank to be flipped and oriented allowing no obstructions for the preferred tool to cut material. An optional truss rod slot may also be cut into the neck shaft. An optional truss rod may be inserted into the truss rod slot before the fingerboard is glued on. The fingerboard may be glued onto the neck shaft in a 2-piece or laminate construction. In some embodiments, the neck shaft and fingerboard may be constructed as a one-piece neck.

Once the fingerboard is glued onto the neck shaft, other features may also be cut into the neck shaft (e.g., shape profile, fret slots, fretboard and side markers, tuner holes). A final step may include sanding all surfaces of the neck removing any edges, dips, indentations or anything that may be non-conforming to the player's hand. After the sanding step, any one of many types of protective finishes can be applied to the neck shaft and fingerboard.

In embodiments where the neck is made of wood, any standard tools for woodworking may be used in the process (e.g., chisels, routers, files, etc.). In some embodiments, the neck may be made using computer numerical control ("CNC") machining. In embodiments where the neck is made with CNC machining, minimal tools or sanding may be needed in the final step before optionally applying protective finishes.

As is understood by a person of ordinary skill in the art, the reverse taper neck may be manufactured or made using a standard method used to manufacture a traditional neck having a positive taper. Depending on the preference of the player, the slope, thickness, back profile shape may be adjusted on the reverse taper as needed. For example, the reverse taper may have two different slopes, or more than three different slopes. Similarly, the neck may have one or more back profile shapes along the back of the neck. The difference of thickness at the distal end and the proximal end may be adjusted for a more drastic reverse taper slope or a more mild reverse taper slope.

As the terms are used herein with respect to measurements (e.g., dimensions, characteristics, attributes, components, etc.), and ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. A neck for use in a string instrument, the neck comprising:

a proximal end;

a distal end that opposes the proximal end; and an elongated neck shaft extending from the proximal end to the distal end so as to define a frontside disposed proximate a fingerboard and a backside that is opposite the fingerboard, the proximal end is connectable to a body of the string instrument, the distal end is connectable to or includes a headstock;

wherein the elongated neck shaft comprises:

a proximal end portion that extends distally from the proximal end toward the distal end;

a distal end portion that extends proximally from the distal end toward the proximal end; and a middle portion that is flanked by the proximal end portion and the distal end portion;

wherein a thickness of the elongated neck shaft is defined between the fingerboard and a backmost portion of the backside;

wherein the distal end portion has a distal end portion thickness that is larger than a proximal end portion thickness of the proximal end portion.

2. The neck of claim 1, wherein the proximal end portion, the middle portion, and the distal end portion form a tapered portion having a continuous gradual taper along a length of the elongated neck shaft.

3. The neck of claim 1, wherein the proximal end portion tapers at a first slope, the middle portion tapers at a second slope, and the distal end portion tapers at a third slope; wherein the first slope, the second slope, and the third slope are identical.

4. The neck of claim 1, wherein the proximal end portion tapers at a first slope, the middle portion tapers at a second slope, and the distal end portion tapers at a third slope; wherein at least two of the first, second, and third slopes are different from each other.

5. The neck of claim 4, wherein the first slope is different from the second slope.

6. The neck of claim 4, wherein the second slope is different from the third slope.

7. The neck of claim 1, wherein the proximal end portion, the middle portion and the distal end portion form a tapered portion having a stepped taper along a length of the elongated neck shaft.

8. The neck of claim 1, wherein a shape profile is defined as a shape of a cross section of the backside of the elongated neck shaft; wherein the backside has a variable shape profile along a portion of the elongated neck shaft.

9. The neck of claim 8, wherein the proximal end portion has a first shape profile and the distal end portion has a second shape profile.

10. The neck of claim 9, wherein the first and the second shape profile are identical.

11. The neck of claim 10, wherein the first shape profile is U-shaped and the second shape profile is ovally C-shaped.

12. The neck of claim 1, further comprising frets that are spaced apart along the fingerboard, wherein the thickness of the distal end portion is defined at about a first fret adjacent the distal end; wherein the thickness of the proximal end portion is defined at, about a twelfth fret adjacent the proximal end.

13. The neck of claim 12, wherein a thickness of the distal end portion is about 0.80 to about 1.12 inches, and a thickness of the proximal end portion is about 0.750 to about 1.00 inches.

14. The neck of claim 12, wherein a thickness of the distal end portion is about 0.865 inches, and a thickness of the proximal end portion is about 0.780 inches.

15. The neck of claim 1, wherein the neck further comprises a heel portion protruding from the proximal end, the heel portion being configured to be fastened to the body of the string instrument.

16. The neck of claim 1, wherein the neck is designed to be modularly connectable to a guitar body.

17. A string instrument having a neck, the neck comprising:

a proximal end;

a distal end that opposes the proximal end; and an elongated neck shaft extending from the proximal end to the distal end so as to define a frontside disposed proximate a fingerboard and a backside that is opposite the fingerboard, the proximal end is connectable to a body of the string instrument, the distal end is connectable to or includes a headstock;

wherein the elongated neck shaft comprises:

a proximal end portion that extends distally from the proximal end toward the distal end;

a distal end portion that extends proximally from the distal end toward the proximal end; and a middle portion that is flanked by the proximal end portion and the distal end portion;

wherein a thickness of the elongated neck shaft is defined between the fingerboard and a backmost portion of the backside;

wherein the distal end portion has a distal end portion thickness that is larger than a proximal end portion thickness of the proximal end portion.

18. A method of making a neck for use in a string instrument, comprising:

forming a neck blank having a proximal end and a distal end that opposes the proximal end into an elongated neck shaft extending from the proximal end to the distal end and having a frontside and a backside opposite the frontside, the elongated neck shaft comprising:

a proximal end portion that extends distally from the proximal end toward the distal end;

a distal end portion that extends proximally from the distal end toward the proximal end; and a middle portion that is flanked by the proximal end portion and the distal end portion; and wherein a thickness of the elongated neck shaft is defined between the frontside and a backmost portion of the backside;

wherein the distal end portion has a distal end portion thickness that is larger than a proximal end portion thickness of the proximal end portion.

19. The method of claim 18, wherein the proximal end portion, the middle portion, and the distal end portion form a tapered portion having a continuous gradual taper along a length of the elongated neck shaft.

20. The method of claim 18, wherein the proximal end portion tapers at a first slope, the middle portion tapers at a second slope, and the distal end portion tapers at a third slope; wherein at least two of the first, second, and third slopes are different from each other.

* * * * *